March 19, 1968  D. H. DALY  3,374,079
APPARATUS FOR MOLDING GLASS
Filed Oct. 29, 1964  3 Sheets-Sheet 1
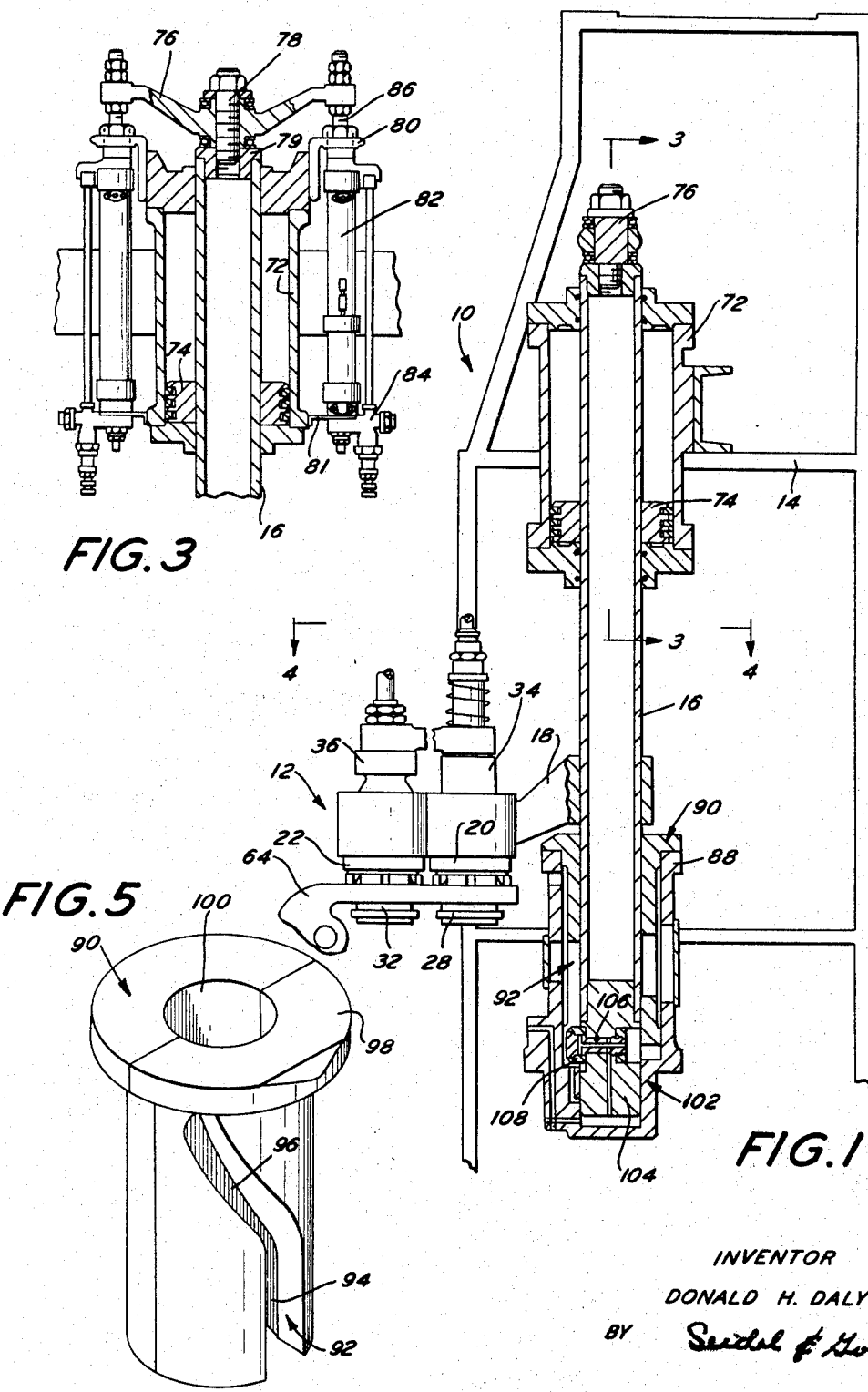
INVENTOR
DONALD H. DALY
BY Seidel & Gonda
ATTORNEYS.

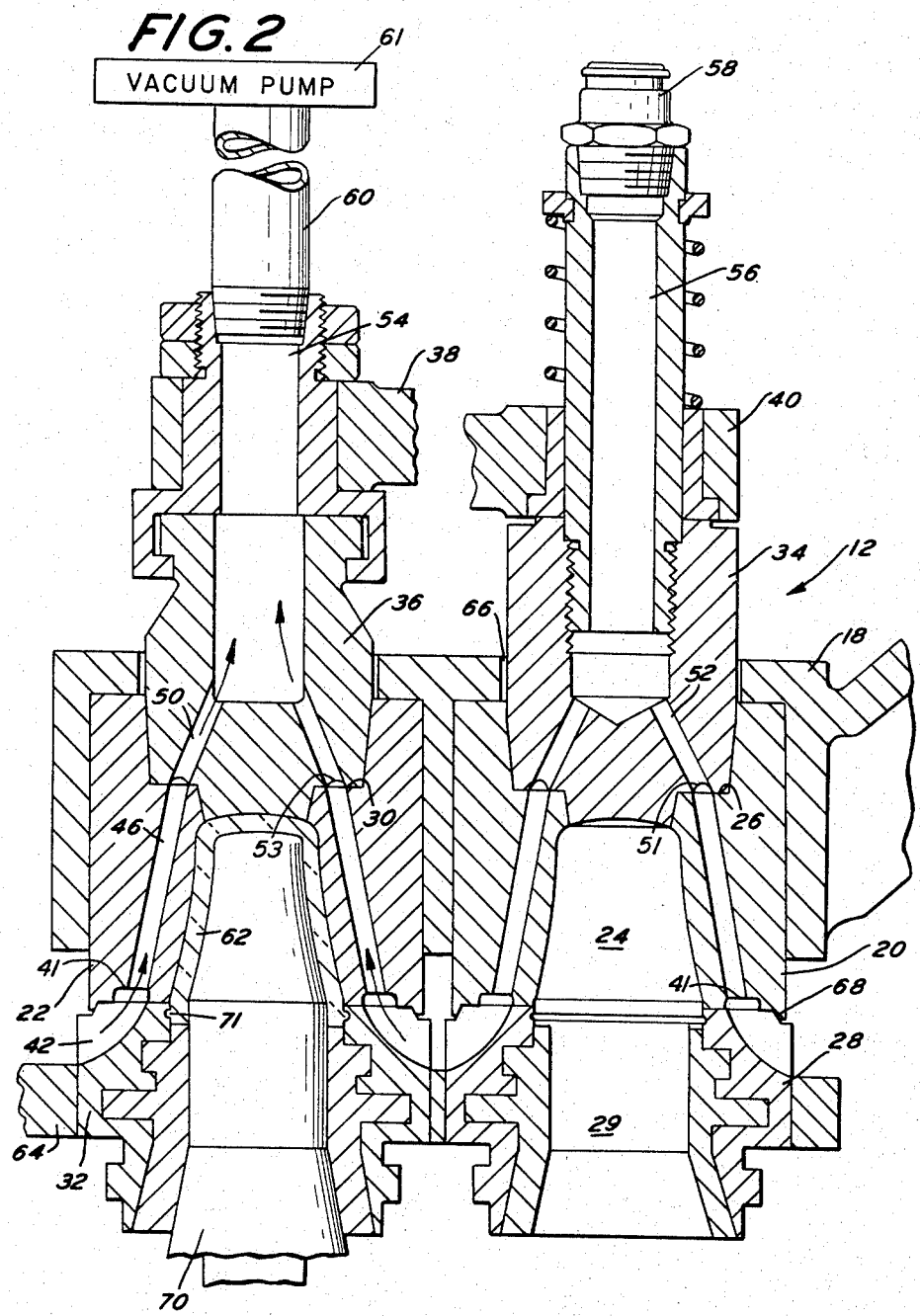

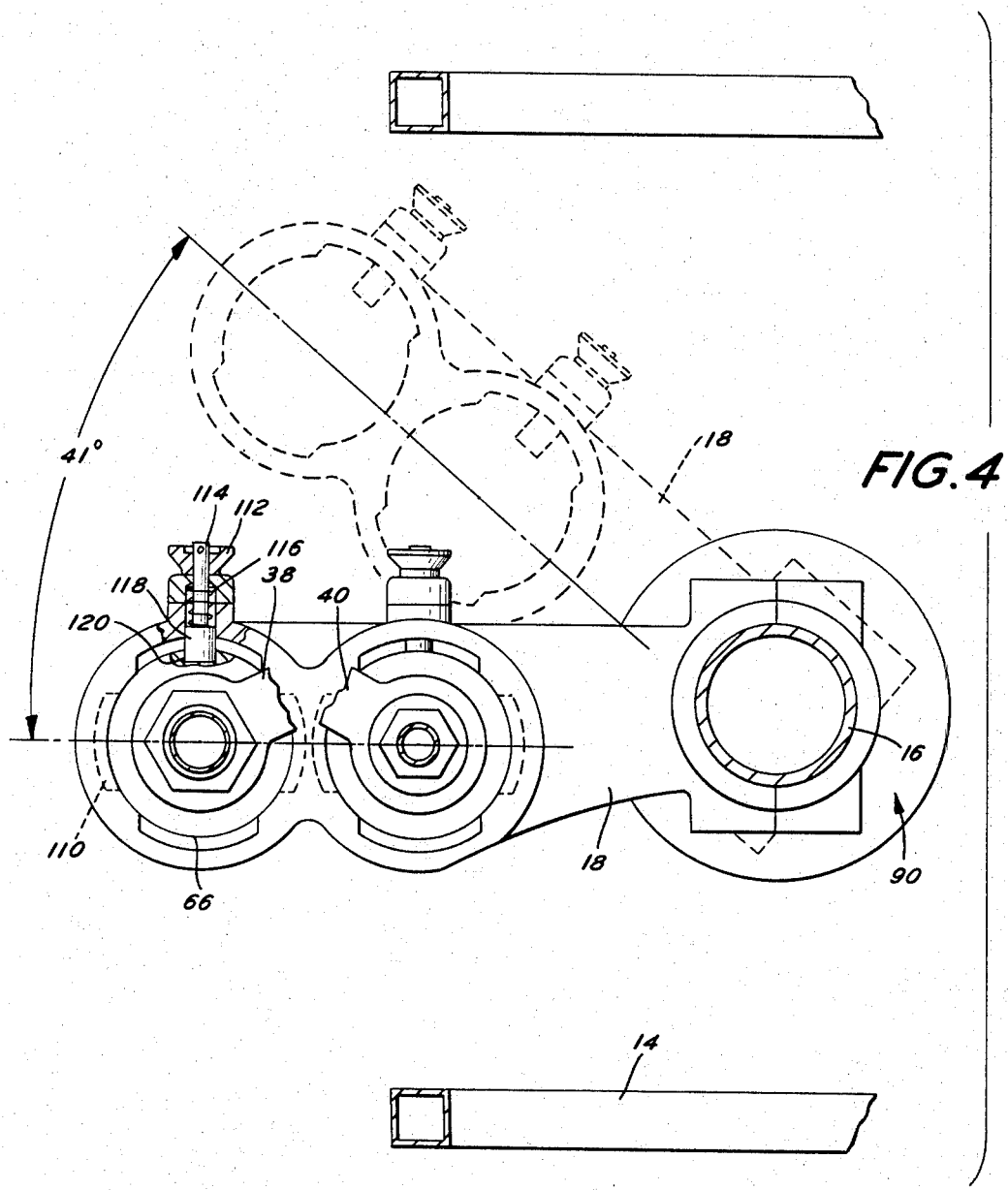

United States Patent Office 3,374,079
Patented Mar. 19, 1968

3,374,079
APPARATUS FOR MOLDING GLASS
Donald H. Daly, Winchester, Ind., assignor to Maul Brothers, Inc., Millville, N.J., a corporation of New Jersey
Filed Oct. 29, 1964, Ser. No. 407,324
5 Claims. (Cl. 65—232)

ABSTRACT OF THE DISCLOSURE

Apparatus for forming hollow glass articles from sequentially supplied charges of glass to a mold. Air passages are provided in the baffle, mold and in the neck mold therebelow. A vacuum pump is utilized to draw air from the atmosphere through air passages to effect cooling of the neck mold, mold and baffle which permits the apparatus to run more rapidly.

---

This invention relates to apparatus for molding molten glass into hollow shaped articles.

Hollow glass articles are usually formed by first press molding a gob of molten glass into a parison or blank of molten glass. The formed blank or parison is then inverted and transferred to a blow mold wherein it is subjected to a blowing process for forming the hollow glass article in its final shape.

The parison is usually formed in a blank mold positioned between a neck mold and a baffle. A gob of glass is dropped through one end of a molding cavity in the blank mold. The baffle is seated within the blank mold to close one end of the molding cavity after the gob has been transferred to the molding cavity. A vertically reciprocable plunger is brought up through the neck mold into the molding cavity in the blank mold for pressing the gob of glass into a parison against the walls of the molding cavity. The bottom of the molded parison is adapted to be caught and retained in the neck mold.

After the plunger is withdrawn and the pressing operation completed, the baffle is elevated and removed from the blank mold. The blank mold is then elevated. The parsion remaining in the neck mold is then transferred to a blow mold wherein the blowing operation described above takes place.

One method which may be used for transferring the parisons to the blow mold is to oscillate the neck mold and retained parison, thereby inverting the parison and positioning it in the blow mold. The neck mold in such cases is usually split so that by pivoting the split halves relative to each other the parison may be dropped into the blow mold. When such an operation takes place, the baffle and the blank mold must not only be elevated, but must be pivoted out of the path of oscillation of the neck mold.

It is desirable to maintain the apparatus cycling substantially continuously. This increases the efficiency of the operation as well as enabling the hollow glass articles to be formed in rapid succession.

If the apparatus is to be kept in operation continuously the neck mold and blank mold must be designed so as to be cooled continuously and in rapid fashion when they are in their parison forming relation. The temperatures involved in the pressing operation are of necessity high. If the pressing operations are to be accomplished in rapid succession, the molds must be rapidly cooled to prevent them from burning up. Also, the temperature of the molds must be such as to maintain the temperature of the formed parison suitable for a subsequent blowing operation.

Accordingly, it is an object of this invention to provide an improved apparatus for molding glass.

A further object of this invention is to provide an apparatus for molding glass specifically designed for high speed production of molded hollow glass articles.

A still further object of this invention is to provide an apparatus for molding glass incorporating an improved mold cooling system for continuously and efficiently cooling the molds in the apparatus when in use.

Yet another object of this invention is to provide an apparatus for molding glass having improved mechanical features for raising and swinging the blank mold used in the apparatus out of the path of transfer of a formed parison from a parison forming station to a blowing station.

Other objects will appear from the disclosure which follows hereinafter.

For the purpose of illustrating the invention, there is shown in the drawings a form which is presently preferred; it being understood, however, that this invention is not limited to the precise arrangements and instrumentalities shown.

FIGURE 1 is a side view in elevation of a portion of an apparatus for molding glass with certain portions broken away and shown in section for the purpose of illustration.

FIGURE 2 is a fragmentary cross-sectional view through a parison forming station of the apparatus illustrated in FIGURE 1.

FIGURE 3 is a partial section view taken along line 3—3 of FIGURE 1.

FIGURE 4 is a cross-sectional view taken substantially along the plane indicated by the line 4—4 of FIGURE 1 and illustrating in phantom the manner in which the mold holder of the apparatus is pivoted during the transfer operation of a formed parison.

FIGURE 5 is a perspective view of a cam element used in the apparatus illustrated in FIGURE 1.

The molding apparatus of the present invention is generally designated by the numeral 10. The apparatus 10 includes a parison forming station 12. As is well-known in the art, a parison or hollow glass blank is pressed at the station 12. The formed parison is adapted to be transferred from the parison forming station 12 to a blowing station. At the blowing station, the formed parison is positioned within a blow mold and the parison is blown into its final shape.

With specific reference now to FIGURE 2, it will be seen that a pair of blank molds 20 and 22 are provided. For the purpose of illustration, a pair of blank molds are shown, but it should be understood that only a single blank for forming a single parison may be provided. The double blank allows for the substantially simultaneous formation of a pair of parisons. Although the blanks 20 and 22 are shown as being of the solid type, it should also be understood that they may be split for purposes well-known in the art.

The blank molds 20 and 22 include a molding cavity 24 open at both ends. An annular seat 26 is formed in the blank mold 20 and an annular seat 30 is formed in the blank mold 22. The seats 26 and 30 are adapted to receive a pair of baffle assemblies 34 and 36 respectively. The baffle assemblies are adapted to be positioned in one end of the molding cavity 24 in each of the blank molds in order to close the molding cavity from above. Prior to seating of the baffle assemblies, a gob of glass is inserted within each molding cavity 24, as is conventional in the art.

The blank molds 20 and 22 are supported by means of a mold holder arm 18. The mold holder arm 18 in turn is connected to a hollow piston rod 16 projecting from a cylinder 72 supported by the frame 14 of the machine. The operation of the piston rod and the cylinder, will be discussed below.

The mold holder arm 18 includes of spaced openings 66 through which the baffle assemblies 34 and 36 extend when they are brought into juxtaposition with the blank molds 20 and 22. As shown more clearly in FIGURE 4, the openings 66 are provided with opposed radial extensions. The blanks mold 20 and 22 are provided with opposed radial outward extensions 110.

The cavities within the mold holder arm 18 are substantially circular in cross section. Hence, the blank molds are adapted to be positioned through the openings 66 into the cavities in the mold holder arm 18 and rotated.

Each blank includes an aperture 120 in its outer periphery. A pin 114, spring biased by a coil spring 116 towards the outer periphery of each blank mold, extends through a housing 112 in the mold holder arm 18. When the aperture 120 is opposite the enlarged end portion 118 of the pin 114, the spring 116 will cause the end portion 118 to seat within the aperture 120 and lock the blank mold to the arm 18.

Alternatively, the blank molds 20 and 22 may be bolted to the mold holder arm 18.

A pair of neck molds 28 and 32 are adapted to be placed beneath the blank molds 20 and 22 respectively. Each neck mold and blank mold includes annular mating surafce areas 68. The registration of the areas 68 insures alignment of the bore 29 in the neck molds with the molding cavity 24 in the blank molds.

After a gob of glass is placed within each molding cavity 24 in the blank molds, a vertically reciprocable plunger 70 is adapted to enter each molding cavity 24 through the bore 29 in each neck mold and press the gob of glass into a parison 62. Some of the molten pressed glass enters the top of each neck mold and is captured in an annular groove 71 adjacent the top of the neck mold.

During the pressing operation, the blank molds are subjected to high temperatures. In order to cool the blank molds 20 and 22 and the neck molds 28 and 32 as well as maintaining the temperature of the formed parison at a suitable temperature for a subsequent blowing operation, a plurality of air passages 46 are formed in each blank mold surrounding the molding cavity 24 and a plurality of air passages 42 are formed in each neck mold surrounding its bore 29. The air passages 42 in the neck mold are open to the atmosphere and are in communication with the air passages 46 in each mold blank. A groove 41 (FIGURE 2) is provided in the bottom face of blank molds 20 and 22 to ensure communication between the air passages 42 and 46.

The baffle assembly 36 includes a hollow chamber 54 communicating at one end by means of air passages 50 with the air passages 46 in the blank mold 22. Grooves 51 and 53 are provided at the base of the baffle assemblies 34 and 36, respectively, to ensure constant communication between air passages 50 and 52 with air passages 46. The other end of the chamber 54 communicates by means of an air hose 60 to a source of vacuum. The source of vacuum may comprise a conventional vacuum pump 61 such as that illustrated in FIGURE 2 of the drawing. Similarly, the baffle assembly 34 includes a hollow chamber 56 communicating at one end by means of air passages 52 with the air passages 46 in the mold blank 20. At its other end, the hollow chamber 56 receives an air hose coupling. An air hose is adapted to be coupled to the coupling 58 and connected to a suitable source of vacuum.

It should thus be apparent that during the pressing operation, air is adapted to be drawn through the neck molds and blank molds from the atmosphere. That is, a source of vacuum will draw air through the air passages 42 in each neck mold, the air passages 46 in each blank mold, through the passages 50 or 52 in each baffle assembly, and into the hollow chambers 54 to 56. In this manner, the neck molds and the blank molds may be cooled and the temperature of the parison maintained suitable for a subsequent blowing operation.

After the pressing operation has been completed, the baffle assemblies 34 and 36 are adapted to be removed from seated engagement within the blank molds 20 and 22 respectively. The blank molds and the mold holder arm 18 are adapted to be raised and pivoted approximately forty-one degrees from their parison forming position. The parison 62 remain with the neck molds 28 and 32.

The neck molds 28 and 32 are connected to a transport arm 64. The transport arm 64 is adapted to be oscillated through one hundred eighty degrees to invert the parisons 62 and deposit them within a blow mold wherein a subsequent blownig operation takes place. The transport arm and its associated mechanism is well-known to those skilled in the art and is shown, for example, in Patent 3,024,571 to R. B. Abbott et al. Further, the blow mold and bottom plate apparatus can be cooled in a manner similar to that prescribed above by connecting air passages in these elements to a suitable source of vacuum and drawing air through them.

The neck molds are split and are adapted to have their halves pivot relative to each other to release the parison 62 and deposit it within the blow mold. Since the neck molds oscillate in a substantially vertical plane, the baffle assemblies 34 and 36 as well as the blank molds 20 and 22 must be pivoted out of the plane of oscillation of the neck molds at a high enough elevation to prevent interference with the transport operation.

Accordingly, connected to each of the baffle assemblies 34 and 36 is a baffle transport arm 40 and 38 respectively. The manner in which the baffle arms 38 and 40 are connected to their respective baffle assemblies is of no moment in the present invention, and it is sufficient to understand that the arms when raised and rotated will raise and rotate their associated baffle assemblies. A suitable mechanism for raising and rotating the baffle assemblies 34 and 36 is well-known to those skilled in the art, and is also shown in Patent 3,024,571.

The apparatus 10 also includes an improved mechanism for raising and rotating the mold holder arm 18 and the blank molds 20 and 22. As previously stated, the mold holder arm 18 is integrally supported by the piston rod 16. The piston rod 16 projects downwardly from a cylinder 72 supported by hte frame of the machine 14. Secured to the hollow piston rod 16 is a piston 74 reciprocable within the cylinder 72.

At its top end, the piston rod 16 projects upwardly from the cylinder 72. A stud 78 projects upwardly from a cap positioned in the upper end of the piston rod 76. A yoke 16 is pivotally connected to the stud 78.

Connected to each end of the yoke 76 is the piston rod 86 of a pneumatic cylinder 82. The cylinders 82 are mounted on the upper head of the cylinder 72 by means of a mounting bracket 80. A mounting bracket 81 also connects the lower end of the cylinders 82 to the lower end of the cylinder 72.

Air is adapted to be admitted and exhausted to and from the cylinder 82 through a two way valve 84. Upon the admission of air to each cylinder 82, the yoke 76 and the piston rod 16 are adapted to move upwardly through the cylinder 72. The piston 74 restrains and guides the movement of the rod 16 in a vertical path. Upon the exhaust of air through the valve 84, the piston rod 16 will be correspondingly lowered.

Since the mold holder arm 18 is integrally connected to the piston rod 16, actuation of the cylinders 82 will cause the mold holder arm and the blank molds 20 and 22 to move away from the neck molds 28 and 32. However, the mold holder arm 18 must also be swung out of the path of oscillation of the neck mold transport arm 64.

In order to effect the requisite pivotable movement of the mold holder arm 18, a cam housing 88 is provided. The cam housing 88 is supported by the frame 14 below the parison forming station 12 and mold holder arm 18. A cam generally designated by the numeral 90 is seated within the cam housing 88.

The cam 90 includes a cam slot 92 having a straight portion 94 and a helical portion 96. The cam 90 includes a flange 98 for seated engagement on the top of the cam housing 88 and a bore 100 through which the hollow piston rod 16 extends.

Secured to the lower end of the piston rod 16 is a cam follower assembly generally designated by the numeral 102. Cam follower assembly 102 includes a substantially cylindrical block 104 mounted in the lower end of the hollow piston rod 16. A cam roller stud 106 extends through the block 104. A cam roller 108 is mounted on the outer end of the stud 106 and as adapted to roll along the slot 92 in the cam 90 upon upward movement of the piston rod 16.

It will be seen that as the cam roller 108 rolls in the straight portion 94 of the cam slot 92, the mold holder arm 18 will move vertically only. When the cam roller 108 enters the helical portion 96 of the cam slot 92, mold holder arm 18 will not only continue its vertical movement, but will also swing through an arc of approximately forty-one degrees. This movement is shown in phantom lines in FIGURE 4. Therefore, the mold holder arm and the blank molds 20 and 22 are adapted to be moved out of the path of movement of the transport arm 64.

The operation of the apparatus 10 is substantially as follows:

The neck molds are positioned at the parison forming station 12 by the transport arm 64. The split neck molds are closed when they reach the parison forming station 12. The piston rod 16 is then lowered to move the mold holder arm 18 and blank molds 20 and 22 into juxtaposition with the neck molds 28 and 32. Mating surfaces 68 on the neck molds and blank molds assure the proper aligning of the bores 29 and the molding cavity 24. The cam 90 assures that the air passages 46 in the blank molds and air passages 42 in the neck molds are in communication when the blank molds are brought into their parison forming position.

The mold cavities 24 are then charged with a gob of glass deposited through their upper open ends. The baffle assemblies 34 and 36 are then brought into seated engagement with the seats 26 and 30 in the upper ends of the blank molds to close the upper ends of their molding cavities. The air passages 50 and 52 will be in communication with the air passages 46 in each blank mold. The mechanisms for raising and lowering the baffle assemblies assure the proper positioning of the passages in the baffle assemblies with respect to the air passages in the blank molds. Such mechanisms are conventional in the art and may be of the type shown in U.S. Patent 1,976,239, described on page 10, lines 60 to 98, and shown in FIGURE 22 thereof.

Meanwhile, the pressing operation has been initiated by moving a plunger 70 in timed relationship through the bores 29 in the neck molds and into the molding cavities 24. The plungers 70 will press the molten glass charge or gob into a parison 62. Each parison 62 is captured within its respective neck mold.

During the pressing operation, air is continuously being drawn through the air passages 42, 46, 50 or or 52, and into the hollow chambers 54 to 56. The neck molds and mold blanks are therefore cooled as well as the bottom of each baffle assembly. Parisons 62 are also maintained at a temperature suitable for a subsequent blowing operation.

After the pressing operation has been completed, the plungers 70 are removed from the molding cavities 24 and bores 29 as is well-known in the art. For example, see Patent 3,024,571, referred to earlier.

The baffle assemblies 34 and 36 are then moved vertically and swung through an arcuate path. Air is then admitted to the cylinders 82 to move the piston rod 16 upwardly. Piston rod 16 first moves substantially in a vertical direction only and then swings about a vertical axis through an arc of aproximately forty-one degrees as its vertical elevation continues. This is accomplished by means of the cam 90 in contact with a cam follower assembly 102 mounted in the end of the piston rod 16.

Transport arm 64 is then oscillated about a horizontal axis to position the parisons 62 in a blow mold. The apparatus is then recycled.

Since the mold blanks and neck molds have been continuously cooled during the pressing operation, they may be rapidly and efficiently used in the operating cycle.

Although the above description relates principally to single or double gob glass molding apparatus, it should be understood that the cooling principles employed in connection with the present invention may be used in triple gob glass molding apparatus.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for forming hollow glass articles from sequentially supplied charges of glass, said apparatus including a blank mold having a molding cavity which is vertically disposed and open at both ends, said blank mold being supported on a neck mold, said neck mold having an air passage opening therein, a plunger movable so as to enter the molding cavity from the bottom, a baffle assembly for selectively closing the upper end of the cavity after the charge of molten glass has been introduced into the cavity, said blank mold having at least one air passage opening therethrough and extending to a bottom surface thereof, said air passage opening in said blank mold communicating at one end at the bottom surface with one end of said air passage opening in said neck mold, the other end of said air passage in said neck mold communicating with atmosphere, and vacuum means connected to the other end of said air passage in said blank mold for drawing air from the atmosphere through the passage in said neck mold and through the passage in said blank mold to thereby cool said neck mold and blank mold, said vacuum means causing said air to contact said neck mold when said air is in its coolest state.

2. Apparatus in accordance with claim 1 wherein a pair of blank molds are supported adjacent one another, each of the blank molds having similar air passages, the air passages in the blank molds communicating with one another.

3. Apparatus in accordance with claim 1 wherein said blank mold is supported for reciprocation and rotation by an arm connected to a portion of a piston rod between a piston connected to the piston rod and a cam cooperating with a cam follower on the piston rod.

4. Apparatus for forming hollow glass articles from sequentially supplied charges of glass, said apparatus including a blank mold having a molding cavity which is vertically disposed and open at both ends, said blank mold being supported on a neck mold, said neck mold having an air passage opening therein, a plunger movable so as to enter the molding cavity from the bottom, a baffle assembly including a baffle for selectively closing the upper end of the cavity after the charge of molten glass has been introduced into the cavity, said blank mold having at least one air passage opening therethrough, said blank mold air passage communicating at one end with one end of said neck mold air passage, the other end of said neck mold air passage communicating with atmosphere, one end of said baffle air passage communicating with said other end of said blank mold air passage, and vacuum means connected to the other end of said baffle air passage for drawing air from the atmosphere through the passage in said neck mold and through said blank mold passage and said baffle passage to thereby cool said neck mold and blank mold and baffle, said vacuum means causing atmospheric air to contact said neck mold when said air is in its coolest state.

5. Appartus in accordance with claim 4 wherein a pair of blank molds are supported adjacent one another, each of the blank molds having similar air passages, the air passages in the blank molds communicating with one another.

References Cited
UNITED STATES PATENTS

| | | | |
|---|---|---|---|
| 1,894,100 | 1/1933 | Kadow | 65—355 X |
| 2,106,546 | 1/1938 | Canfield et al. | 65—217 X |
| 3,241,941 | 3/1966 | Abbott et al. | 65—235 |

DONALL H. SYLVESTER, *Primary Examiner.*

FRANK W. MIGA, *Examiner.*